No. 721,750.  
PATENTED MAR. 3, 1903.  
E. V. SANTEE.  
COOKING UTENSIL.  
APPLICATION FILED MAY 3, 1902.  
NO MODEL.  
2 SHEETS—SHEET 1.

Witnesses  
O. M. Simpson  
H. J. Shepard

E. V. Santee Inventor  
by C. A. Snow & Co.  
Attorneys

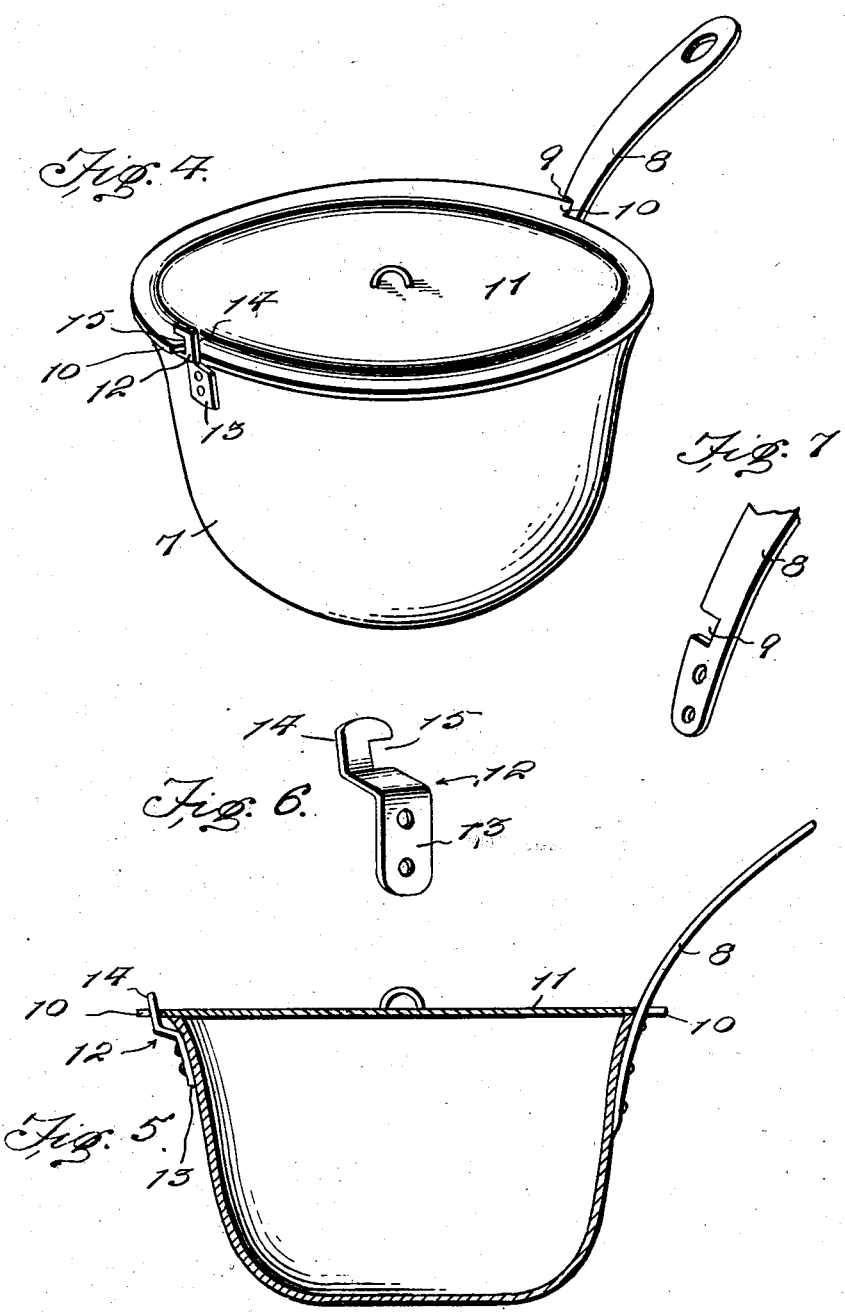

UNITED STATES PATENT OFFICE.

ELMER V. SANTEE, OF WATERTOWN, NEW YORK.

COOKING UTENSIL.

SPECIFICATION forming part of Letters Patent No. 721,750, dated March 3, 1903.

Application filed May 3, 1902. Serial No. 105,837. (No model.)

*To all whom it may concern:*

Be it known that I, ELMER V. SANTEE, a citizen of the United States, residing at Watertown, in the county of Jefferson and State of New York, have invented a new and useful Cooking Utensil, of which the following is a specification.

This invention relates to kettles and similar utensils, and has for its object to provide improved means for temporarily holding the cover thereon, so as to obviate loss thereof when tilting the kettle to drain the same, and also for facilitating the application and removal of the cover without manipulating fastening devices.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
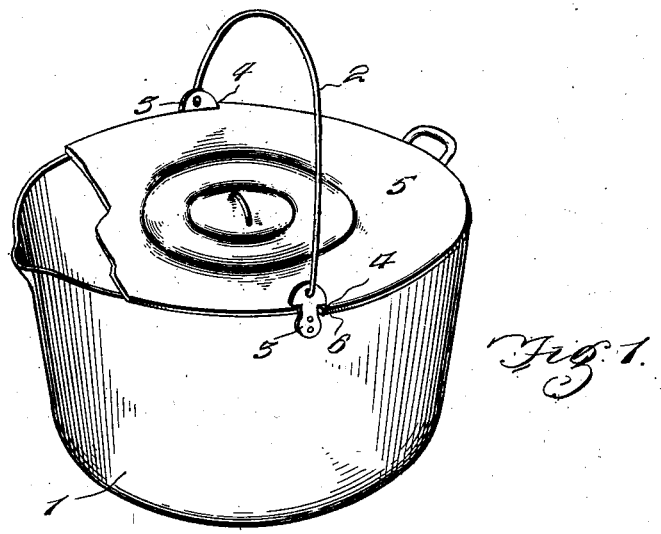
Figures 2, 5:
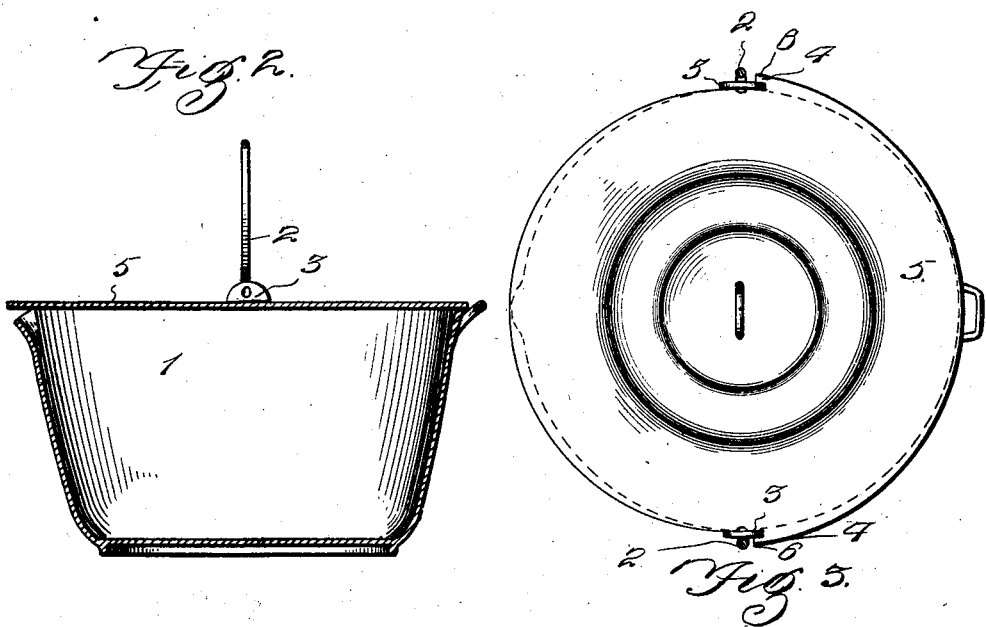

In the drawings, Figure 1 is a perspective view of a kettle having the present invention applied thereto. Fig. 2 is a longitudinal sectional view thereof. Fig. 3 is a top plan view. Fig. 4 is a perspective view of a saucepan constructed in accordance with this invention. Fig. 5 is a sectional view of the same. Fig. 6 is a detail view of the lug or ear which is engaged by one of the projections of the cover. Fig. 7 is a detail view of a portion of the handle, illustrating the construction of the cover-receiving notch or recess.

Like characters of reference designate corresponding parts in all of the figures of the drawings.

Referring to the drawings, 1 designates an ordinary kettle which is provided with the usual bail-handle 2. For connecting each end of the handle to the kettle there is provided the improved ear 3, which is secured to the outer side of the kettle and projects above the upper edge thereof and having an opening for the reception of the hooked end of the bail. The upper portion having the opening is enlarged and segmental in shape, thereby providing the opposite projections or shoulders 4, which overhang the upper edge of the kettle at opposite sides of the ear.

The lid or cover 5 is substantially circular or of the required shape to fit the top of the receptacle and is provided with the opposite marginal projections 6, lying wholly in one half-section of the cover and not quite diametrically opposite each other. These projections are preferably formed by having the marginal edge of the lid extended outwardly at one side of the cover and then terminated abruptly, as clearly indicated in Fig. 3 of the drawings.

In applying the lid or cover to the kettle it is slid edgewise across the top of the kettle with the normal portion of the cover projected between the ears 3 until the projections or shoulders 6 take under the shoulders of the ears and strike against the latter, whereby the cover is stopped at the required position to properly cover the kettle. As the shoulders of the ears overhang and fit snugly the top portions of the shoulders of the cover, the latter is held against accidental displacement, and when the kettle is tilted upon its handle the shoulders of the ears will still hold the cover in place, so that the kettle may be drained without necessitating the holding of the cover, as the latter is effectually retained in place during the tilting of the kettle.

It is designed to have the lid or cover struck from a single piece of sheet metal, so that the projections or shoulders 6 may be integral therewith, and thereby durable to obviate breakage of the shoulders by constant use.

In Figs. 4 to 6 of the accompanying drawings is illustrated another form of the invention in which the improvements are applied to a saucepan 7, having a handle 8, of the usual configuration, rigidly connected with the body of the saucepan and provided at one side with a notch 9, located at the upper edge of the saucepan and forming an overhanging shoulder similar to the shoulders of the ears 3, heretofore described. The shoulder formed by the notch 9 is adapted to be engaged by one of the projections 10 of a lid or cover 11, which is similar in construction to the lid or cover 5, heretofore described. The other marginal projection 10 is engaged by an overhanging shoulder of a lug or ear 12, consisting of a plate having a lower portion 13 and an angularly-bent upper portion 14, provided at the upper edge of the saucepan with a notch or recess 15, forming an overhanging shoulder similar to the notch or recess of the handle 8. The lid or cover is placed on the saucepan in the same manner as the lid or cover 5, heretofore described, and it is securely held in place by the overhanging shoulders of the handle and the lug or ear, which form rigid upwardly-extending cover-engaging devices. The lower portion 13 of the lug is perforated for the reception of rivets or other suitable fastening devices for the purpose of securing the lug or ear to the saucepan, and the upper portion of the lug or ear is angularly bent to clear the flaring upper portion of the saucepan.

It will be clear that the improvements herein shown and described are applicable to various kinds of receptacles, and I desire it to be understood that changes in the form, proportion, size, and the minor details of construction within the scope of the appended claims may be resorted to without departing from the spirit or sacrificing any of the advantages of this invention.

What is claimed is—

1. A utensil provided at opposite sides with upwardly-extending ears provided above the upper edges of the body portion of the utensil with projections forming shoulders, and a lid or cover slid edgewise between the ears and provided with opposite enlargements forming shoulders for engaging the said ears to limit the sliding movement of the lid or cover in one direction and to retain the same on the utensil, substantially as described.

2. A utensil, having opposite upstanding handle-ears, which are provided with segmental upper portions rising above the upper edge of the body of the utensil and projected at opposite sides of the ears to form shoulders located above the upper edge of the utensil, and a cover, having opposite outwardly-directed marginal projections lying wholly in one half-section of the cover and forming shoulders engaged beneath corresponding shoulders of the opposite ears, whereby the cover is held in place.

3. A cover or lid for utensils, which is struck from a single piece of sheet metal and substantially circular in shape, one edge portion of the cover being gradually widened in opposite directions and then terminated abruptly within one half-section of the cover, thereby forming opposite outwardly-directed shoulders lying in the plane of the cover combined with a utensil provided at opposite sides with recesses receiving the enlarged portions of the cover, substantially as described.

4. A utensil provided at opposite sides with upwardly-extending rigid cover-engaging devices provided above the upper edges of the utensil with shoulders, and a cover provided at opposite sides with tapering marginal projections or extensions gradually increasing in width toward the center of the cover and forming shoulders at points substantially at opposite sides of the center of the cover, said projections or extensions engaging the said devices and extending beneath the shoulders of the same, substantially as described.

5. A utensil provided at opposite sides with upwardly-extending ears provided at each of their edges with recesses forming shoulders located above the upper edges of the body of the receptacle, and a cover having a reduced portion to fit between the ears and provided with an enlarged or widened portion forming shoulders for engaging those of the ears, said cover being adapted to be slid between the ears from either side of the receptacle, substantially as described.

In testimony that I claim the foregoing as my own I have hereto affixed my signature in the presence of two witnesses.

ELMER V. SANTEE.

Witnesses:
GEO. P. SENECAL,
ELMER E. WORTHEN.